July 4, 1933.     C. H. HARRISON ET AL     1,916,949
CELLULAR SYNTHETIC CARBONATE PRODUCT
Filed Feb. 2, 1931
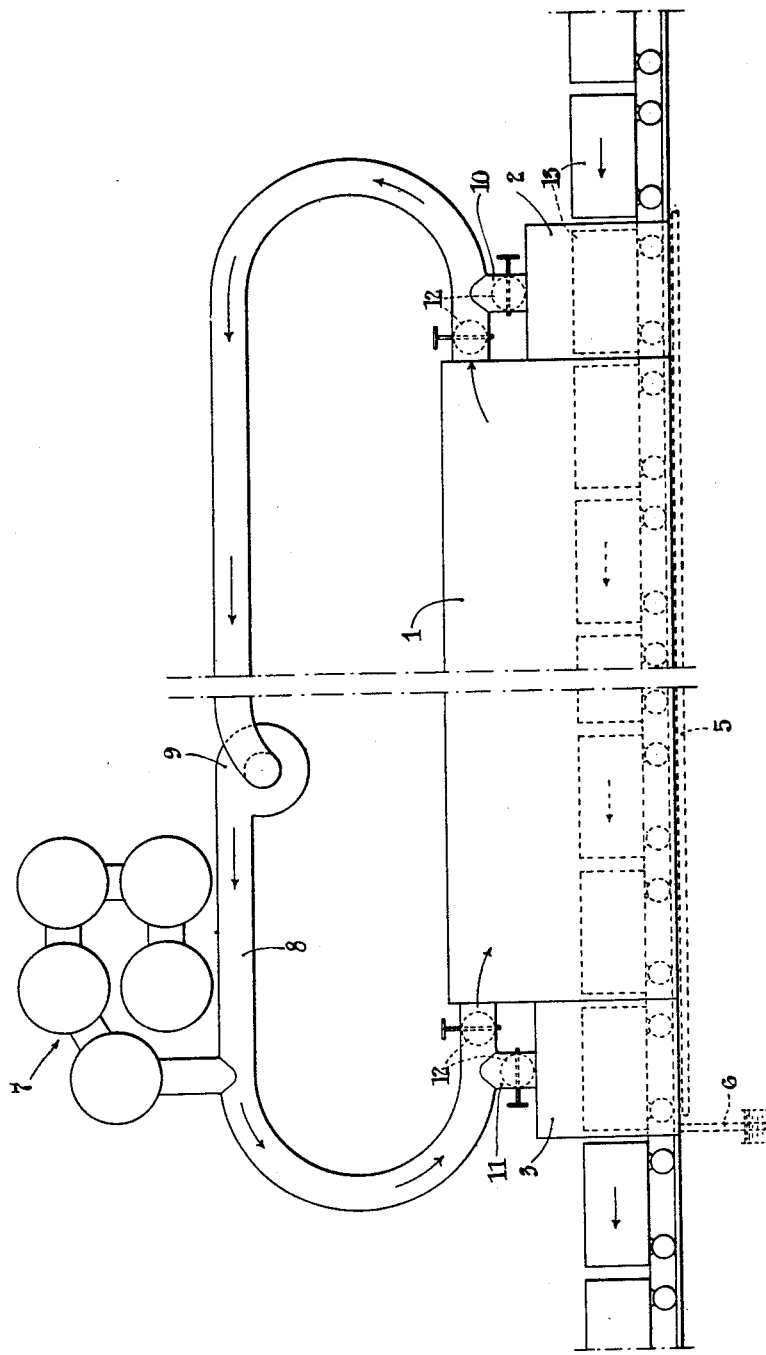
INVENTORS
CHARLES H. HARRISON
ARTHUR H. HARRISON.
BY  Marks & Clerk
ATTORNEYS.

Patented July 4, 1933

1,916,949

UNITED STATES PATENT OFFICE

CHARLES HOLMES HARRISON, OF IRON ACTON, ENGLAND, AND ARTHUR HUGO HARRISON, OF GOLD PINES, ONTARIO, CANADA, ASSIGNORS TO CARBONATED LIME PROCESSES LIMITED

CELLULAR SYNTHETIC CARBONATE PRODUCT

Application filed February 2, 1931. Serial No. 512,999.

This invention relates to a process of making synthetic building materials, either solid or porous, from lime and a suitable aggregate, the lime constituting the essential ingredient, which when carbonated, as herein described, binds the whole into a structural unit.

It has heretofore been proposed to carbonate lime in the production of artificial stone. Finely divided rock material has been mixed with lime, and the mixture has been molded to the desired shape under pressure, dried and subjected to the action of carbonic acid gas under increasing gas pressure. Carbonation by this method is very slow, and the conversion of the lime into carbonate is liable to be incomplete, thereby giving a non-uniform and relatively weak product. It has also been proposed to carbonate by drying the mixture of rock and lime, wetting it and then subjecting it to the action of $CO_2$ under pressure. In carbonating by this method there are two principal difficulties; the great rapidity with which carbonation begins generates so much heat that the material is liable to be cracked, and the water that accumulates in excess of what is required retards greatly the progress of the chemical reaction to its desired end, viz. the complete conversion of the lime into carbonate.

The object of the present invention is to provide a more economical method of carbonation, in which preliminary drying of the mass may be avoided, in which the carbonating period is reduced, in which the drying and carbonating are effected simultaneously, and in which the regulation of the rate of drying automatically regulates the rate of carbonation.

A further object of the invention is to provide a method that will eliminate or at least greatly reduce the risk of cracking, and that will effect carbonating with the least consumption of $CO_2$ gas. Other objects of the invention will appear from the description now to be given.

It has now been found that the amount of water present has a great effect upon the rate of carbonation. A certain degree of wetness is most favourable, but owing to the large variety of materials that may be employed, the great variation in the proportions of the ingredients, the methods of mixing and pressing, and, speaking generally, the very variable character of the conditions, it is impossible to define precisely the most suitable amount of water or to maintain it in practical operation on a commercial scale. But whatever the most suitable amount of water may be in each case, it is quite certain that if the mass while containing more water than the quantity most favourable to carbonation is dried by heat it must in passing from a wet to a dry state pass through that stage of wetness that is most favourable to carbonation. If $CO_2$ gas has access to the material when it arrives at this stage carbonation must take place.

In accordance with this invention therefore, the wet mass is directly subjected to carbonation at substantially atmospheric pressure, and drying and carbonation are effected simultaneously under suitable conditions of temperature and humidity. The slurry of lime and aggregate is poured into a suitable mold and may be placed, either at once or when it has been partly dried, in a gas-tight heated chamber. $CO_2$ is then passed continuously through the heated chamber until carbonation is complete.

The aggregate mixed with the lime in the formation of the slurry comprises stone dust or, when a porous product is to be produced, bubbles formed in or introduced into the slurry in any desired known way, or both stone dust and bubbles. While the proportion of lime to aggregate, in either case, may vary within wide limits the following illustrative examples are given.

To make a solid product, 200 parts by weight of hydrated lime may be mixed with 800 parts by weight of marble dust, passing through, say, a No. 20 screen with fines. From this a slurry is made with 330 parts by weight of water. The slurry is placed in a mold and subjected to pressure of, for example, two tons per square inch. The amount of water left in the mass will be in excess of 75% of the weight of the lime and sufficient to insure the desired carbonation when the molded mass is subjected to simultaneous drying and carbonation in the gas chamber.

To make a cellular product a slurry may be made from 1000 parts by weight of hydrated lime and 1400 parts by weight of water. With one volume of this slurry there is then mixed two volumes of an aggregate of bubbles. After uniform mixing the slurry is poured into molds. When the material is of such a character that, in order to prevent the cellular structure from collapsing or the mass from contracting it has to be dried in a humid atmosphere, it may be kept in a moist heated chamber in which there is no $CO_2$ present until it has set. It may then be subjected to simultaneous drying and carbonation as already described.

It will be observed that in each case there is present sufficient water to insure that during the drying process in the presence of the $CO_2$ gas, carbonation is free to proceed during the full range of variation in the water content and that, therefore, the maximum rate of carbonation will be obtained. In other words, since carbonation is free to proceed at all stages of drying, when the critical or preferred moisture content is reached in successive portions of the mass, the maximum rate of carbonation will occur and the whole mass will be carbonated in a minimum of time.

The accompanying drawing illustrates diagrammatically and by way of example a form of apparatus which may be used in carrying out the process.

In the drawing 1 represents a carbonating chamber which may preferably have an auxiliary admission chamber 2 at the entrance end and a discharge chamber 3 at the exit end, in order to prevent the gas in the carbonating chamber or tunnel from becoming diluted with air when the tunnel is opened for the admission or withdrawal of a truck carrying the material to be carbonated. These auxiliary or ante-chambers are adapted by any suitable means, not shown, to be substantially closed from the rest of the tunnel and of being filled separately with the carbonating gas. Pipes 5 through which a heating fluid may circulate are provided at any suitable place or places in the tunnel for the purpose of controlling the temperature therein. Pipe 6 represents a drain pipe through which condensed water may be discharged and its discharge end is submerged in water, preferably with a film of oil thereon to avoid loss of gas. An apparatus illustrated at 7 may be provided for recovering $CO_2$ gas from the lime producing kilns, for example, or it may recover the $CO_2$ from any other available source and be adapted to purify the same. This or any other convenient source of $CO_2$ gas is connected to the carbonating tunnel by means of a conduit 8 in which is located a fan 9 for directing the flow of gas. The conduit preferably has branches 10 and 11 connected with the antechambers and dampers 12 are provided at each of the outlets from the conduit for controlling the point of discharge of the gas in the manner indicated.

Trucks or cars 13 are provided for carrying the molded slurry to be carbonated through the tunnel. If desired, tracks may be provided or the trucks or cars may be propelled along the floor through the tunnel in any desired way. It will be understood that an additional chamber may be provided in which the material may be subjected to a moist heated atmosphere free from $CO_2$ until it has set. If the continuous system is employed, the cars may then be transferred to the carbonating tunnel or in a batch system the moist air may be replaced with $CO_2$ gas.

In operation the adequately mixed slurry is poured into molds. If the material is pressed it will become hard and may be removed from the molds and loaded on the trucks in any convenient way. If the material is unpressed it may remain in the molds during carbonation, and the molds may be of perforated or woven metal or other material to permit of rapid drying and to give free access of the gas to the material to be carbonated. The molds are substantially the shape and size of the required building units, or blocks of the desired size and shape may be cut from the molded material. The molds or the pressed blocks after they have been removed from the molds, are loaded on the trucks in such a manner as to give free circulation about the material to be carbonated and the truck pass into the drying and carbonating tunnel which is maintained at a suitable temperature. A current of substantially pure $CO_2$ gas preferably at atmospheric pressure is kept in continuous circulation through the tunnel by means of the fan. Any water which is condensed is drained away. The trucks are maintained in the tunnel until carbonation is complete when the molded slurry becomes a unitary mass having the aggregate bound or cemented together by means of the carbonate formed.

The temperature in the drying and carbonating tunnel may vary within substantial limits, but it is preferable to begin drying and carbonation at a temperature in the neighborhood of 120° F. When carbonation has progressed substantially the temperature may be increased without danger. If the initial temperature is too high, the unaerated molded slurry is liable to crack and the aerated slurry to swell, thus deforming the product. It is impracticable to attempt to here define specific ranges of temperature which should be followed since, obviously, the character of the aggregate constitutes an important factor in this consideration. A coarse grained marble aggregate, for example, will stand a considerably higher temperature than a fine grained aggregate.

It will be observed that since the carbonating reaction is an exothermic one, the heat of reaction must be taken into account in controlling the temperature in the carbonating tunnel and will greatly reduce the amount of additional heat necessary to maintain best conditions of temperature for the drying and carbonating tunnel.

The term "aggregate" as used in the appended claims is intended to include finely crushed stone or other mineral matter, or bubbles, or both together. The lime employed may be either a calcium or a magnesium lime or a combination of the two.

We claim:

1. A cellular synthetic product the aggregate of which consists of cells bonded into a structural unit with carbonated lime.

2. A cellular synthetic building material consisting of carbonated lime uniformly interspersed with cells.

3. A cellular synthetic building material consisting of lime hardened by reaction with carbonic acid gas and interspersed with cells.

4. A relatively light weight synthetic carbonate product uniformly interspersed with cells and formed by reacting carbon dioxide with a molded mass of hydrated lime containing entrapped gas bubbles to form a hardened cellular carbonate product.

In testimony whereof we have affixed our signatures.

CHARLES HOLMES HARRISON.
ARTHUR HUGO HARRISON.